Jan. 14, 1930.  E. A. RUSSELL ET AL  1,743,287
HOSE COUPLER
Filed April 21, 1927  2 Sheets-Sheet 1
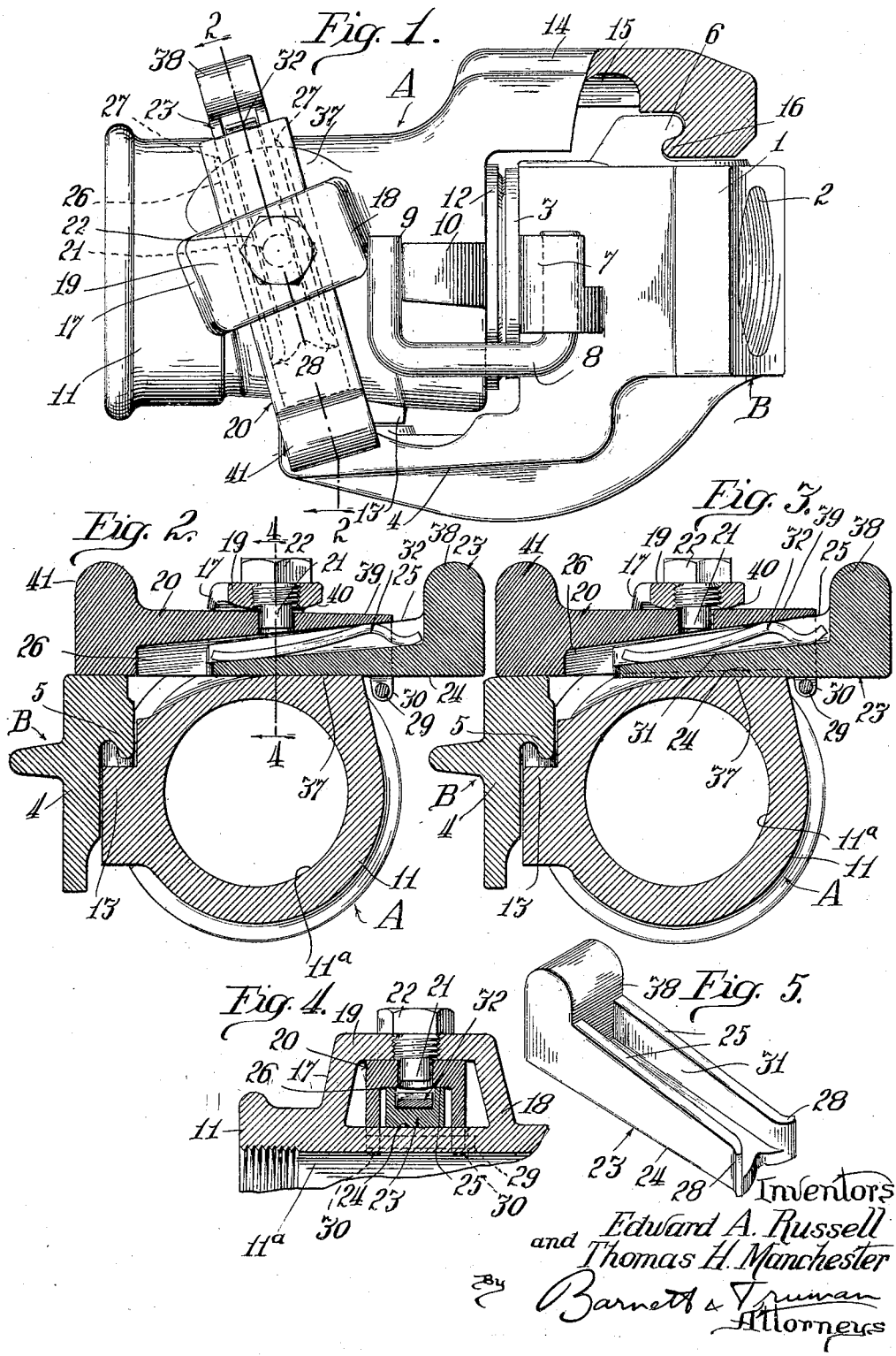
Inventors
Edward A. Russell
and Thomas H. Manchester
By Barnett & Truman
Attorneys

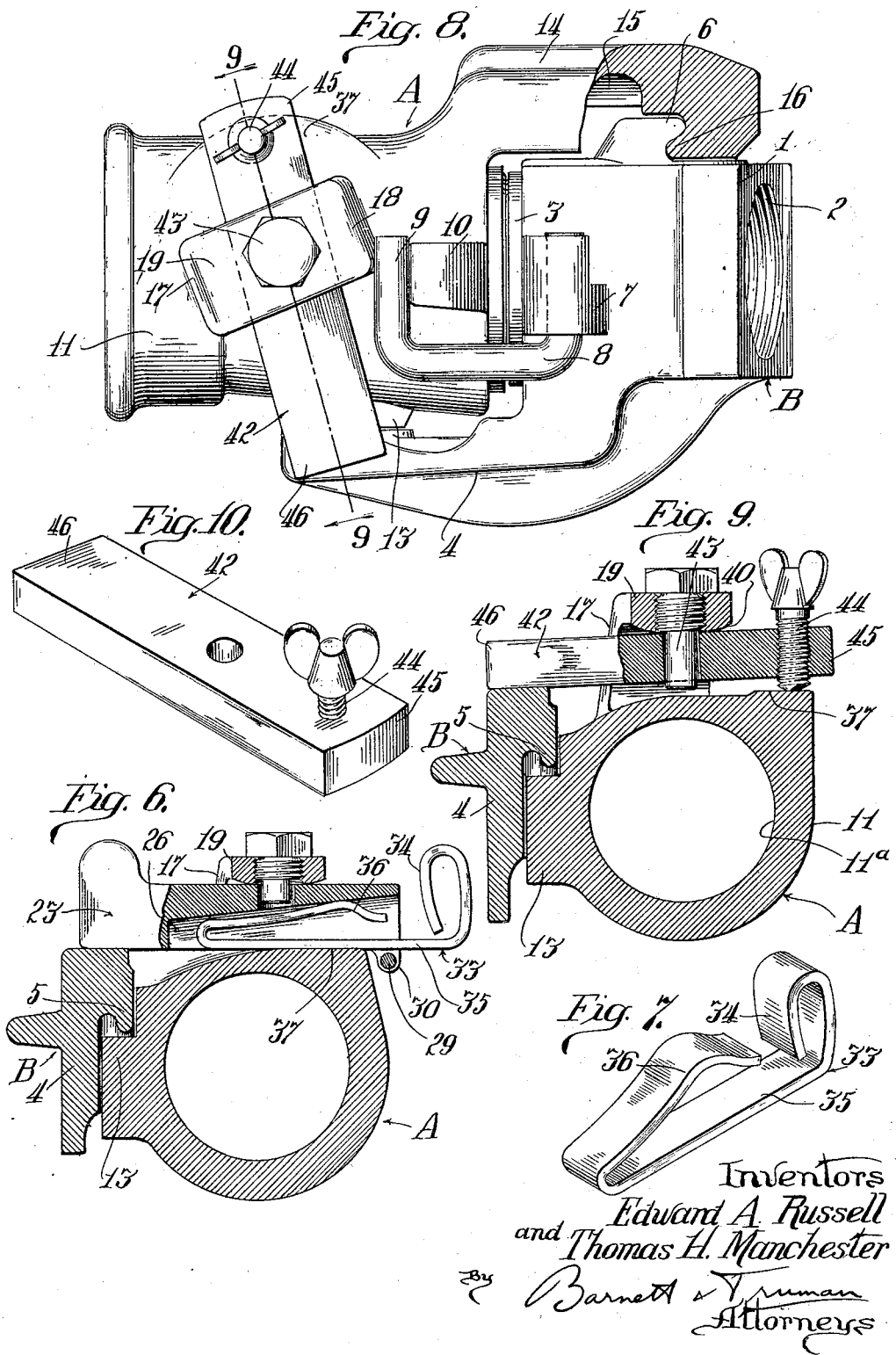

Patented Jan. 14, 1930

1,743,287

UNITED STATES PATENT OFFICE

EDWARD A. RUSSELL AND THOMAS H. MANCHESTER, OF CHICAGO, ILLINOIS, ASSIGNORS TO VAPOR CAR HEATING COMPANY, INC., OF CHICAGO, ILLINOIS, A CORPORATION OF NEW YORK

HOSE COUPLER

Application filed April 21, 1927. Serial No. 185,620.

This invention relates to hose couplings for connecting together the hoses or equivalent flexible metallic structures on the train pipes, steam or air, of railway cars; and the object of the invention is to provide, more particularly in couplings for steam train pipe connections, new and improved means for locking together the couplers or mating members of the coupling.

It has been customary to provide couplers with locking devices of one sort or another, which are forced with wedging pressure against the arms of the mating couplers to hold the couplers in locked relation as against the tendency to be rocked on their cams and disengaged by pull on the hoses when the train rounds a curve, for example. Such positive wedge locks are effective, so far as this purpose is concerned, but the wedging pressure, especially as the locks are frequently driven into place by a hammer, is likely, at least in case of certain types of wedge locks, to injure the gaskets and also to strain or bend the coupler arms and mutilate the cams.

One object of the present invention is to provide a wedge lock which will yield so that injury to the couplers and gasket is prevented and the efficiency of the lock increased and its manipulation made easier.

Another object is to provide a locking device in which the locking arm is first swung to locking position in engagement with the arm of a mating coupler, after which the wedge member is forced to locking position, thus minimizing the danger of injury to the arms.

Another object is to provide such a device in which the wedge member is carried by and telescoped into the swinging locking arm.

Another object is to provide a combined swinging locking arm and wedge member, comprising a spring interposed between the cooperating surfaces of the locking arm and wedge.

Other objects and advantages of this invention will be more apparent from the following detailed description of certain approved forms of the apparatus.

In the accompanying drawings:

Fig. 1 is a plan view of a hose coupler constructed in accordance with this invention, and shown as mated with a coupler of known construction.

Figs. 2 and 3 are vertical sections taken substantially on the line 2—2 of Fig. 1. Fig. 2 illustrates the position of the parts before the wedge is driven to locking position, and Fig. 3 is a similar view after the wedge is driven in.

Fig. 4 is a vertical sectional detail taken substantially on line 4—4 of Fig. 2.

Fig. 5 is a perspective view of the wedge member.

Fig. 6 is a vertical section, similar to Figs. 2 or 3, showing a modified form of the invention.

Fig. 7 is a perspective view of the spring wedge bar shown in Fig. 6.

Fig. 8 is a plan view, similar to Fig. 1, showing another modification.

Fig. 9 is a vertical section, taken substantially on the line 9—9 of Fig. 8.

Fig. 10 is a perspective view of the locking bar used in the form of the invention shown in Figs. 8 and 9.

In the drawings, a hose coupling showing a typical application of the invention is illustrated, consisting of two members or couplers A and B; coupler A being provided with the lock of the present invention and the coupler B being a hose coupler of known type. The coupler of this invention is designed so that it will mate with any of the different types of so-called gravity hose couplers now in use on steam railroads in this country for making the connection between the steam train pipes on adjacent cars of railroad trains; coupler B being shown as typical or illustrative of couplers of this general class of which there are several different makes.

Coupler B consists of a head 1 formed with the steam port 2, in which is arranged a gasket 3, with a forwardly projecting arm 4 provided with an undercut lug or cam 5, and on the other side of the head from arm 4 with a cam lug 6. Projecting from the top of head 1 is a lug 7 in which is pivoted a locking link 8, the angularly disposed end 9 of which is adapted to engage with a lug 10 formed on the mating coupler member.

The improved coupler A comprises a head 11 formed with a steam port 11ª, a gasket 12 being suitably positioned in a gasket seat at the outer end of port 11ª. On one side of the coupler head 11 is the usual under-cut lug or cam 13 adapted to be engaged by the cam 5 of coupler B. The arm 14 of coupler A consists of a curved or concavo-convex web portion 15 terminating in a thickened portion provided with a cam 16 for engagement with the cam 6 on the head of coupler B.

The improved locking device forming the subject matter of the present invention is carried by the coupler A. Arranged diagonally on top of and preferably cast integral with the head 11 is a housing or bracket consisting of upright members 17 and 18 and a connecting member 19. The locking bar 20 is pivoted to swing in a horizontal plane on the downwardly projecting stud 21 of bolt 22 screwed into the cross member 19 of the bracket. A wedge member 23, having a horizontal lower face 24 and a downwardly tapering upper face 25, is adapted to slidably telescope within a correspondingly tapered opening or socket 26 formed within the locking bar 20. The main portion of this socket or passage 26 is somewhat wider than the wedge 23, but the open end portion of the passage makes a substantially close sliding fit against the sides of the wedge, as indicated at 27. The extreme inner end portion of the wedge member 23 is bent or splayed outwardly at 28 to engage the inner walls of the wider portion of the passage 26. The portions 27 and 28 of the locking bar and wedge respectively engage to prevent the complete withdrawal of the wedge member through the end of the locking bar. A pin 29 connecting ears 30 at the open end of the locking bar prevents the complete removal of the wedge member through the open lower portion of the passage when the wedge is drawn off to its extreme position. The wedge 23 is hollowed out, as at 31, to house any suitable form of spring member 32. As here shown, this spring 32 is bowed so that its ends rest within the slot 31 in wedge 23, and its central upwardly bowed portion engages the tapered roof of the passage 26 in locking bar 20. It is not intended that the upper tapered portion 25 of the wedge member shall actually come into engagement at any time with the correspondingly tapered roof of passage 26, but the wedging engagement takes place between the bowed portion of spring 32 and the roof of the passage, so that the wedging action is always yieldable.

Alternatively, the wedge and spring might be formed integral with one another, one example of such a construction being indicated in Figs. 6 and 7. As here shown, a continuous bar of spring metal 33 is so bent as to form an outer head 34, a straight body portion 35, and an upwardly bowed spring portion 36.

When the parts are assembled, as shown in Figs. 1 to 4, the lower plane surfaces of the wedge 23 and locking bar 20 rest upon the flat upper surface 37 of the head 11. These parts will, when in unlocked position, be swung counter-clockwise from the position shown in Fig. 1, so that the coupler heads A and B may be swung into engagement with one another, in the usual manner, until the arms 4 and 14 are locked with the cams 13 and 6, respectively. The assembled locking device is then swung clockwise to the position shown in Figs. 1 and 2, the parts being sufficiently loose to permit this movement without any substantial binding action on either the arm 4 or the head 11. The head 23 is then driven in (toward the left in Fig. 2), by striking the outer head 38 of the wedge with any suitable implement. The assembled wedge 23 and spring 32 will now wedge themselves between the upper surface 37 of head 11 and the roof of passage 26 so as to tilt upwardly the end 39 of locking bar 20, and rock this bar about its fulcrum on the curved lower surface 40 of the cross member 19 of the bracket, so that the opposite end 41 of locking bar 20 will be swung down into firm engagement with the arm 4. This position of the parts is indicated in Fig. 3. During, and after, this driving engagement of the wedge member 23, the spring 32 will yield to a limited extent to permit the parts to become properly adjusted without danger of bending the coupler arm or injuring the gasket, or other portions of the coupler.

It will be noted that no wedging action takes place until the locking bar 20 is swung completely to locking position above the arm 4, so that no undue twisting strains are thrown upon either the locking bar or the arm during this swinging movement.

When two similar couplers A, each equipped with this locking means, are coupled with one another, each of the locking devices will be driven to locking position in the manner hereinabove described. In such a combination there will be no coupler link 8, and the lugs 10 on the coupler heads will not be used, these being provided merely for use when one of the improved couplers A is connected with an old type coupler, such as B.

Some of the advantages of this invention would be retained if the spring 32 were omitted and the wedge 23 engaged directly with the locking bar 20. Such a modification is comprehended within the scope of the invention, but it is preferable that some form of yielding connection be provided between the wedge and locking bar for the reasons discussed hereinabove.

In the form of the invention shown in Figs. 8, 9 and 10, the locking bar 42 is intermediately pivoted on the pin 43 mounted in bracket 19, similarly to the form first described, but instead of the wedge member telescoping into the bar, an adjusting screw 44 is mounted in the end portion 45 of the bar. The action is much the same as in the first form of the invention, the locking bar 42 being first swung about its pivot 43 to locking position, and then the screw 44 is adjusted downwardly through the bar. The lower end of the screw engages the surface 37 on the head thus elevating the end 45 of the bar and swinging it about its fulcrum 40 to force the other end 46 of the bar down into firm locking engagement with the arm 4 of the mating coupler. In order to secure a yielding engagement, the bar 42 may be made of spring material.

We claim:

1. A locking member for a hose coupler comprising a pivoted bar, a wedge member adapted to telescope with the bar, and a spring carried by one member and adapted to wedge against an inclined surface on the other member.

2. In combination a hose coupler comprising a head and a projecting arm, adapted to engage, respectively, the arm and head of a mating coupler, a locking bar pivoted on the head and adapted to swing into locking engagement with the arm of a mating coupler, and a wedge member carried by the bar and adapted to be driven between the head and one end of the bar.

3. In combination a hose coupler comprising a head and a projecting arm, adapted to engage, respectively, the arm and head of a mating coupler, a locking bar pivoted on the head and adapted to swing into locking engagement with the arm of a mating coupler, the bar comprising two telescoping members having a wedged engagement with one another.

4. In combination a hose coupler comprising a head and a projecting arm, adapted to engage, respectively, the arm and head of a mating coupler, a locking bar pivoted on the head and adapted to swing into locking engagement with the arm of a mating coupler, the bar comprising two telescoping members and a spring carried by one member and adapted to wedge against the other member.

5. In combination a hose coupler comprising a head and a projecting arm, adapted to engage, respectively, the arm and head of a mating coupler, a yoke on the head, a locking bar pivoted intermediate its length in the yoke and adapted to swing so that one of its ends engages the arm of a mating coupler, and a wedge carried by the bar and adapted to be driven between the other end of the bar and a portion of the head.

6. In combination a hose coupler comprising a head and a projecting arm, adapted to engage, respectively, the arm and head of a mating coupler, a yoke on the head, a locking bar pivoted intermediate its length in the yoke and adapted to swing so that one of its ends engages the arm of a mating coupler, and a yieldable wedge carried by the bar and adapted to be driven between the other end of the bar and a portion of the head.

7. In combination a hose coupler comprising a head and a projecting arm, adapted to engage, respectively, the arms and head of a mating coupler, a yoke on the head, a locking bar pivoted intermediate its length in the yoke and adapted to swing so that one of its ends engages the arm of a mating coupler, and a wedge member adapted to telescope into the other end of the bar so as to tilt the bar in the yoke and press the first mentioned end into engagement with the mating arm.

8. In combination a hose coupler comprising a head and a projecting arm, adapted to engage, respectively, the arm and head of a mating coupler, a yoke on the head, a locking bar pivoted intermediate its length in the yoke and adapted to swing so that one of its ends engages the arm of a mating coupler, and a yieldable wedge member adapted to telescope into the other end of the bar so as to tilt the bar in the yoke and press the first mentioned end into engagement with the mating arm.

9. In combination a hose coupler comprising a head and a projecting arm, adapted to engage, respectively, the arm and head of a mating coupler, a yoke on the head, a locking bar pivoted intermediate its length in the yoke and adapted to swing so that one of its ends engages the arm of a mating coupler, and a yieldable wedge member adapted to telescope into the other end of the bar so as to tilt the bar in the yoke and press the first mentioned end into engagement with the mating arm, and means to prevent complete separation of the bar and wedge.

10. In combination a hose coupler comprising a head and a projecting arm, adapted to engage, respectively, the arm and head of a mating coupler, a locking bar mounted on the head and movable into locking engagement with the arm of a mating coupler, and a yieldable wedge member carried by the bar and adapted to force the bar into firm locking engagement with the arm.

11. In combination a hose coupler comprising a head and a projecting arm, adapted to engage, respectively, the arm and head of a mating coupler, a locking bar intermediately pivoted on the head and adapted to swing so that one end engages over the arm of a mating coupler, and movable means adapted to be interposed between the other end of the bar and the head.

12. In combination a hose coupler comprising a head and a projecting arm, adapted to engage, respectively, the arm and head of a mating coupler, a locking bar intermediately pivoted on the head and adapted to swing so that one end engages over the arm of a mating coupler, and means movably carried by the other end portion of the bar and adapted to force this end of the bar away from the head.

13. In combination, a hose coupler comprising a head and a projecting arm, adapted to engage, respectively, the arm and head of a mating coupler, a bracket on the head, a vertical pivot pin in the bracket, a locking bar swiveled loosely on said pin so that it may swing substantially horizontally until one end of the bar engages over the arm of a mating coupler, and means adapted for movement between the other end of the bar and the head to tilt the bar about its intermediate fulcrum in the bracket and force the first mentioned end down against the arm.

14. In combination, a hose coupler comprising a head and a projecting arm, adapted to engage, respectively, the arm and head of a mating coupler, a bracket on the head, a vertical pin in the bracket, a locking bar swiveled loosely on said pin so that it may swing substantially horizontally until one end of the bar engages over the arm of a mating coupler, and a wedge member adapted to be forced between the other end of the bar and the head to tilt the bar about its intermediate fulcrum in the bracket and force the first mentioned end down against the arm.

15. In combination with a hose coupler comprising a head, a locking member swiveled on the head so that when rotated in one direction a portion of the member will swing into engagement with a mating coupler, and means mounted for movement between one end of the member and the head for tilting the member at right angles to its plane of rotation into locking engagement with the mating coupler.

16. In combination with a hose coupler comprising a head, a locking member swiveled on the head so that when rotated in one direction a portion of the member will swing into engagement with a mating coupler, and a wedge member mounted for movement between one end of the member and the head for tilting the member at right angles to its plane of rotation into locking engagement with the mating coupler.

EDWARD A. RUSSELL.
THOMAS H. MANCHESTER.